United States Patent
Dube

(10) Patent No.: US 10,983,948 B2
(45) Date of Patent: Apr. 20, 2021

(54) RECONFIGURABLE COMPUTING APPLIANCE

(71) Applicant: Raytheon Company, Waltham, MA (US)

(72) Inventor: Russell E. Dube, Waltham, MA (US)

(73) Assignee: Raytheon Company, Waltham, MA (US)

( * ) Notice: Subject to any disclaimer, the term of this patent is extended or adjusted under 35 U.S.C. 154(b) by 106 days.

(21) Appl. No.: 16/295,058

(22) Filed: Mar. 7, 2019

(65) Prior Publication Data

US 2020/0285603 A1    Sep. 10, 2020

(51) Int. Cl.
*G06F 15/78* (2006.01)
*G06F 21/76* (2013.01)
*G06F 15/76* (2006.01)

(52) U.S. Cl.
CPC ...... *G06F 15/7892* (2013.01); *G06F 15/7896* (2013.01); *G06F 2015/763* (2013.01); *G06F 2015/768* (2013.01)

(58) Field of Classification Search
None
See application file for complete search history.

(56) References Cited

U.S. PATENT DOCUMENTS

| | | | |
|---|---|---|---|
| 5,640,106 A * | 6/1997 | Erickson | H03K 19/177 326/38 |
| 9,501,325 B2 | 11/2016 | Pell et al. | |
| 2011/0302374 A1* | 12/2011 | Cantin | G06F 12/0813 711/141 |
| 2018/0131635 A1* | 5/2018 | Sardaryan | H04L 67/10 |
| 2018/0212889 A1* | 7/2018 | Xu | H04L 47/2441 |
| 2018/0267809 A1* | 9/2018 | Li | G06F 15/7867 |
| 2018/0314671 A1* | 11/2018 | Zhang | G06N 3/0454 |

OTHER PUBLICATIONS

Maxeler Technologies; "Introduction to Data Flow Computing", Jul. 2015.

* cited by examiner

*Primary Examiner* — Hyun Nam
(74) *Attorney, Agent, or Firm* — Burns & Levinson, LLP; Joseph M. Maraia

(57) ABSTRACT

A reconfigurable computing appliance includes a number of computing tiles. Each computing tile includes a reconfigurable processing element and a network fabric interface device configured to communicate over a network fabric. The reconfigurable processing element operates on data received from an I/O input interface and/or data received via the network fabric interface device.

14 Claims, 3 Drawing Sheets

RECONFIGURABLE COMPUTING APPLIANCE

GOVERNMENT RIGHTS

N/A

BACKGROUND

Programmable elements, such as Field Programmable Gate Arrays (FPGAs), are used for High Performance Computing (HPC) tasks. There have not been, however, convenient approaches to packaging these elements with traditional HPC form factors. In addition, there have been no integrated mechanisms for efficiently ingesting large quantities of high rate data streams and then transferring processed results effectively back and forth over HPC cluster network fabrics. These limitations have made it difficult to utilize the capabilities of non-general purpose computing elements, such as FPGAs, for stream computing in HPC or cluster computing environments.

Currently, stream computing requires large amounts of commercial off-the-shelf (COTS) or custom hardware using inefficient integration schemes to perform HPC tasks. The most popular uses of programmable logic, or FPGAs, integrated into HPC clusters are packaged as add-in boards for COTS rack servers. These approaches have limited I/O capacity and do not have cluster fabric integrated capabilities. OpenVPX (and other form factor) circuit card assemblies implemented in card cage-style embedded computing environments cannot efficiently handle large numbers of externally connected I/O and robust cluster fabric interfaces.

What is needed is an improvement in deploying programmable logic elements in a cluster computing environment.

SUMMARY OF THE INVENTION

In one aspect of the present disclosure, a reconfigurable computing appliance (RCA) comprises an enclosure; a network fabric interface provided on the enclosure; a data I/O interface provided on the enclosure; and a first computing tile provided in the enclosure, wherein the first computing tile comprises: a network fabric interface device, coupled to the network fabric interface, configured to transmit data to, and receive data over, a network fabric; and a reconfigurable processing element (RPE), coupled to at least one of the network fabric interface device and the data I/O interface, and configured to process received input data from at least one of the network fabric interface device and the data I/O interface and provide output data to at least one of the network fabric interface device and the data I/O interface, wherein the output data is a function of the received input data.

An RCA may also comprise a daisy-chain port, provided on the enclosure, coupled to the first computing tile, wherein the daisy chain port is operable to couple the first computing tile to a computing tile on another RCA.

In another aspect of the present disclosure, a computing cluster is described comprising: a rack; a plurality of reconfigurable computing appliances (RCAs) mounted in the rack, wherein each RCA comprises: an enclosure; a network fabric interface provided on the enclosure; a data I/O interface provided on the enclosure; and a plurality of computing tiles provided in the enclosure, wherein each computing tile comprises: a network fabric interface device, coupled to the network fabric interface, configured to transmit data to, and receive data over, a network fabric; and a reconfigurable processing element (RPE), coupled to at least one of the network fabric interface device and the data I/O interface, and configured to process received input data from at least one of the network fabric interface device and the data I/O interface and provide output data to at least one of the network fabric interface device and the data I/O interface, wherein the output data is a function of the received input data.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures.

DETAILED DESCRIPTION

Figure 1:
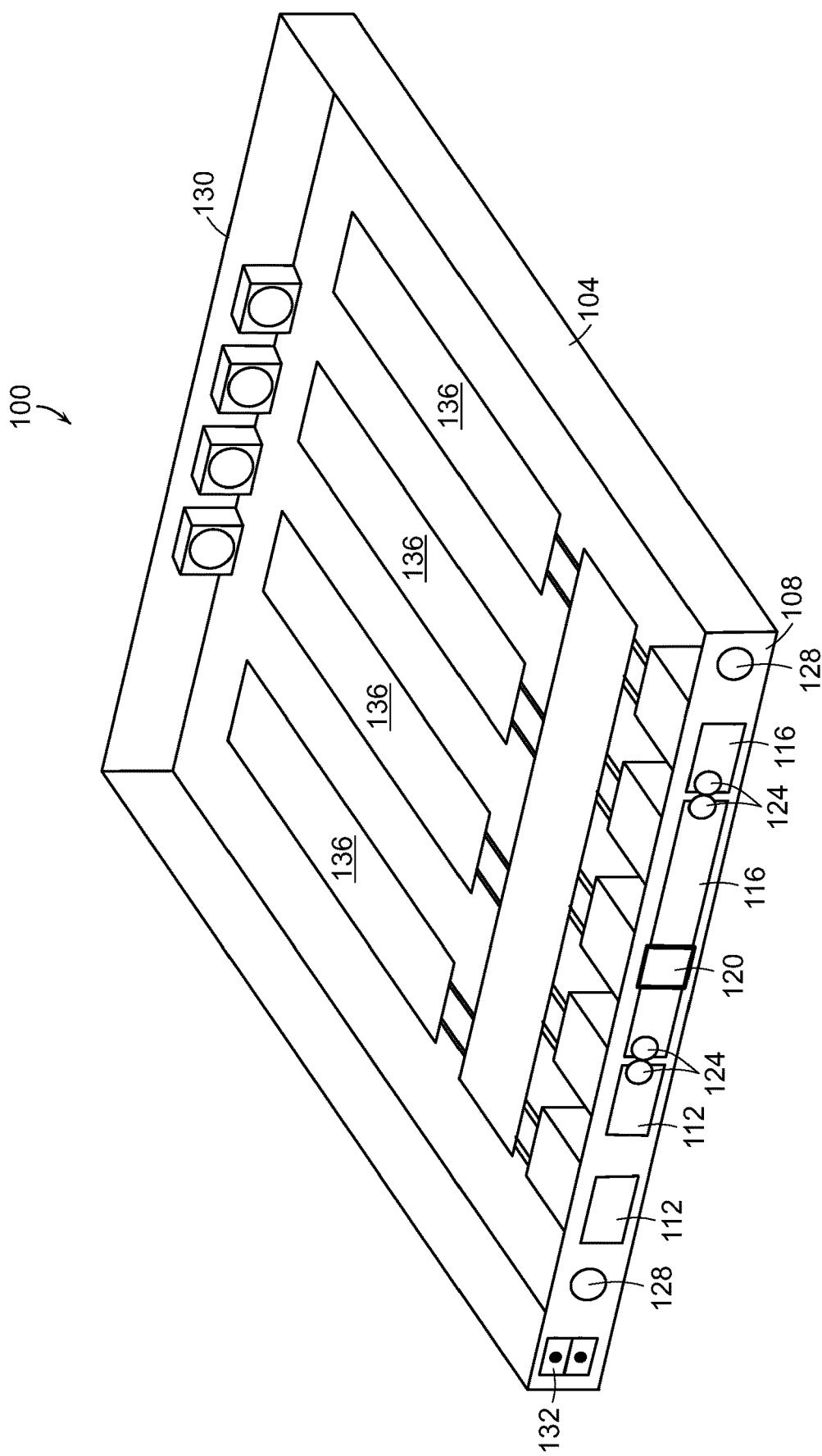
FIG. 1 is perspective view of a reconfigurable computing appliance in accordance with an aspect of the present disclosure.

In the following detailed description, details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

It is to be understood that the present disclosure is not limited in its application to the details of construction and the arrangement of the components or steps set forth in the following description or illustrated in the drawings as it is capable of implementations or of being practiced or carried out in various ways. Also, it is to be understood that the phraseology and terminology employed herein are for description only and should not be regarded as limiting.

Certain features are, for clarity, described in the context of separate implementations, and may also be provided in combination in a single implementation. Conversely, various features, that are, for brevity, described in the context of a single implementation, may also be provided separately or in any suitable sub-combination.

In one aspect of the present disclosure, a Reconfigurable Computing Appliance (RCA) packages reconfigurable processing elements or programmable logic devices, for example but not limited to, FPGAs, in a form factor compatible with commercially available, i.e., standardized, 19" racks. HPC tasks may use the known 19" rack form for simplified integration. Other implementations using HPC, e.g., ground mobile environments, might use a different rack form factor, or might not even be rack-mounted and may require liquid cooling and/or ruggedized packaging options.

Advantageously, the RCA, in accordance with aspects of the present disclosure, provides for I/O, for example, 10, 40 or 100 GB Ethernet, to be directly accessible for processing using programmable logic. This allows for efficient processing of high data rate streams (stream computing) using non-general purpose processing elements. The number of these programmable elements can be scaled in accordance with the desired quantity of I/O required for processing. These I/O links between one or more RCA units can be chained or connected in various configurations, depending on the desired programmable function.

The programmable elements within the RCA include connections to a Remote Direct Memory Access (RDMA)-enabled HPC cluster fabric such as InfiniBand, RoCE, Ethernet, or Omnipath. These connections permit high rate, low-latency data transfer between the RCA programmable logic elements and other HPC processing resources.

Referring now to FIG. 1, a Reconfigurable Computing Appliance (RCA) 100, in accordance with an aspect of the present disclosure, includes an enclosure 104, for example, one corresponding to a standard 19" rack dimension. A front panel 108 includes a plurality of front end data Input/Output (I/O), i.e., bi-directional, interfaces or ports 112 provisioned for receiving input data from, or providing output data to, one or more sources external to the RCA 100 and a plurality of network fabric I/O ports 116, also bi-directional, provisioned for coupling to an HPC network fabric. The data I/O ports 112 may be configured to operate with a 10 GB Ethernet network in one approach. The HPC network fabric may be, for example but not limited to, one of Remote Direct Memory Access (RDMA)-enabled HPC cluster fabric(s) such as InfiniBand, RoCE, Ethernet, or Omnipath. The front panel 108 may also include at least one control port 120, one or more jumper ports 124, one or more daisy chain ports 128 and an on/off switch 132. Each of the control ports 120, jumper ports 124 and daisy chain ports 128 are bi-directional. In one aspect of the present disclosure, some of the network fabric I/O ports 116, the data I/O ports 112, the control port 120, the jumper ports 124, the daisy chain ports 128 or the on/off switch 132 may be provided on a rear portion 130 of the enclosure.

Figure 2:
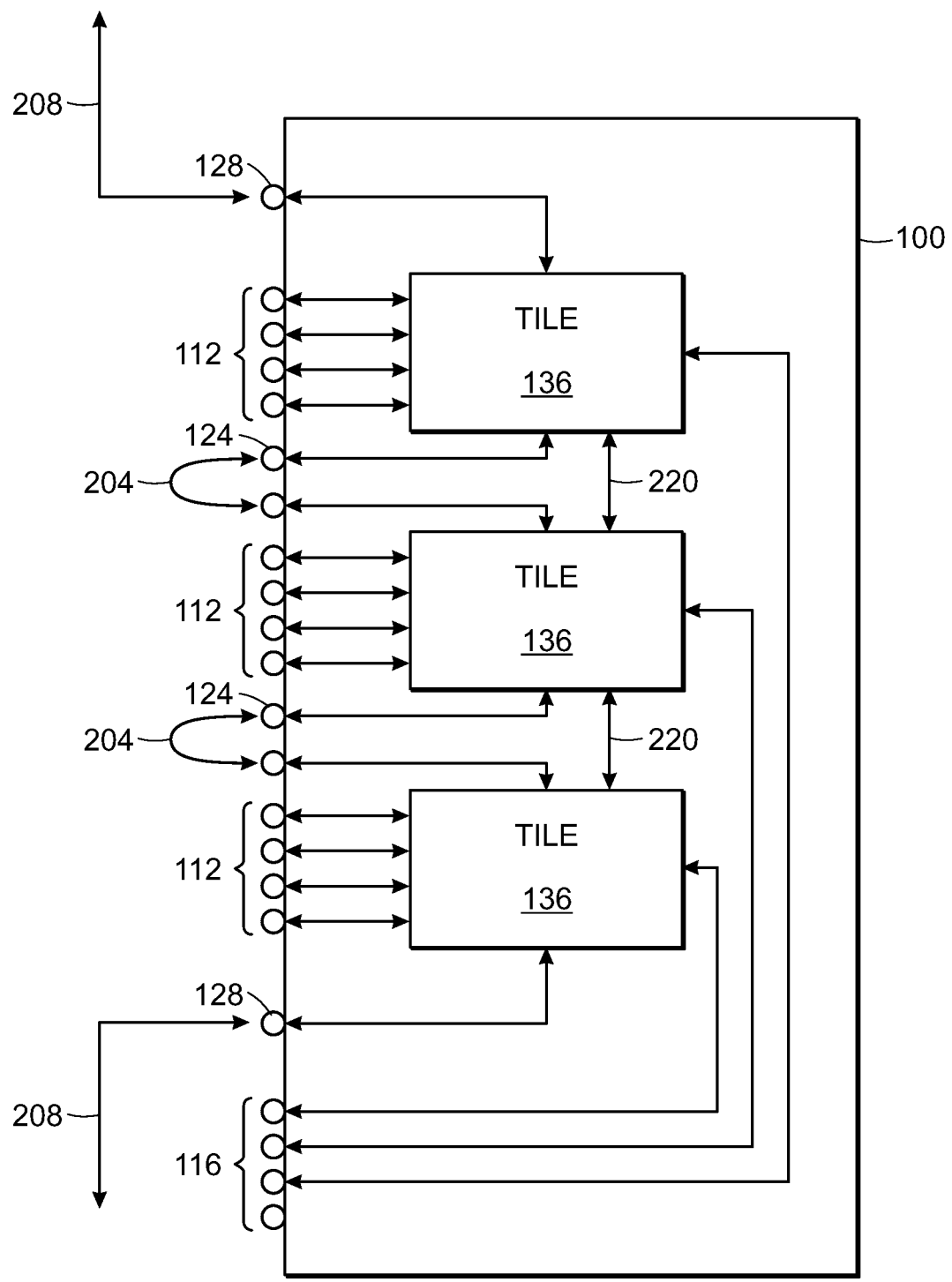
FIG. 2 is a schematic view of the reconfigurable computing appliance of FIG. 1.

One or more computing tiles 136, the details of which are described below, are provided within the enclosure 104. Each of the computing tiles 136 may be coupled to one or more data I/O ports 112, fabric I/O ports 116 and jumper ports 124, as shown in FIG. 2. It should be noted that the RCA 100 could be configured such that a given computing tile 136 is not coupled to either data I/O ports 112 or fabric I/O ports 116 (i.e., only coupled to another computing tile 136); is only coupled to one or the other of the data I/O ports 112 and the fabric I/O ports 116; and/or another computing tile 136; or is coupled to both the data I/O ports 112 and the fabric I/O ports 116 and/or another computing tile 136. Each computing tile 136 may be coupled/decoupled with/from another computing tile 136 within the RCA 100 by connecting an appropriate jumper cable 204 to the jumper ports 124. The jumper cables 204 and jumper ports 124 provide a path for communicating data between tiles 136. The external jumper cables 204 therefore allow for reconfiguration and customization for different use cases.

In addition, a tile can be connected to another tile over a connection 220 that is internal to the RCA 100 in that it does not involve a connection outside of the enclosure 104.

Further, one RCA 100 may be coupled with another RCA 100 through the daisy chain ports 128 and appropriate cabling 208. One of ordinary skill in the art understands that other devices, for example, power supplies, fans, etc., and any corresponding support devices needed to operate the tiles, would also be present in the RCA 100, although not shown. These other devices, however, are not germane to the aspects of the present disclosure.

Figure 3:
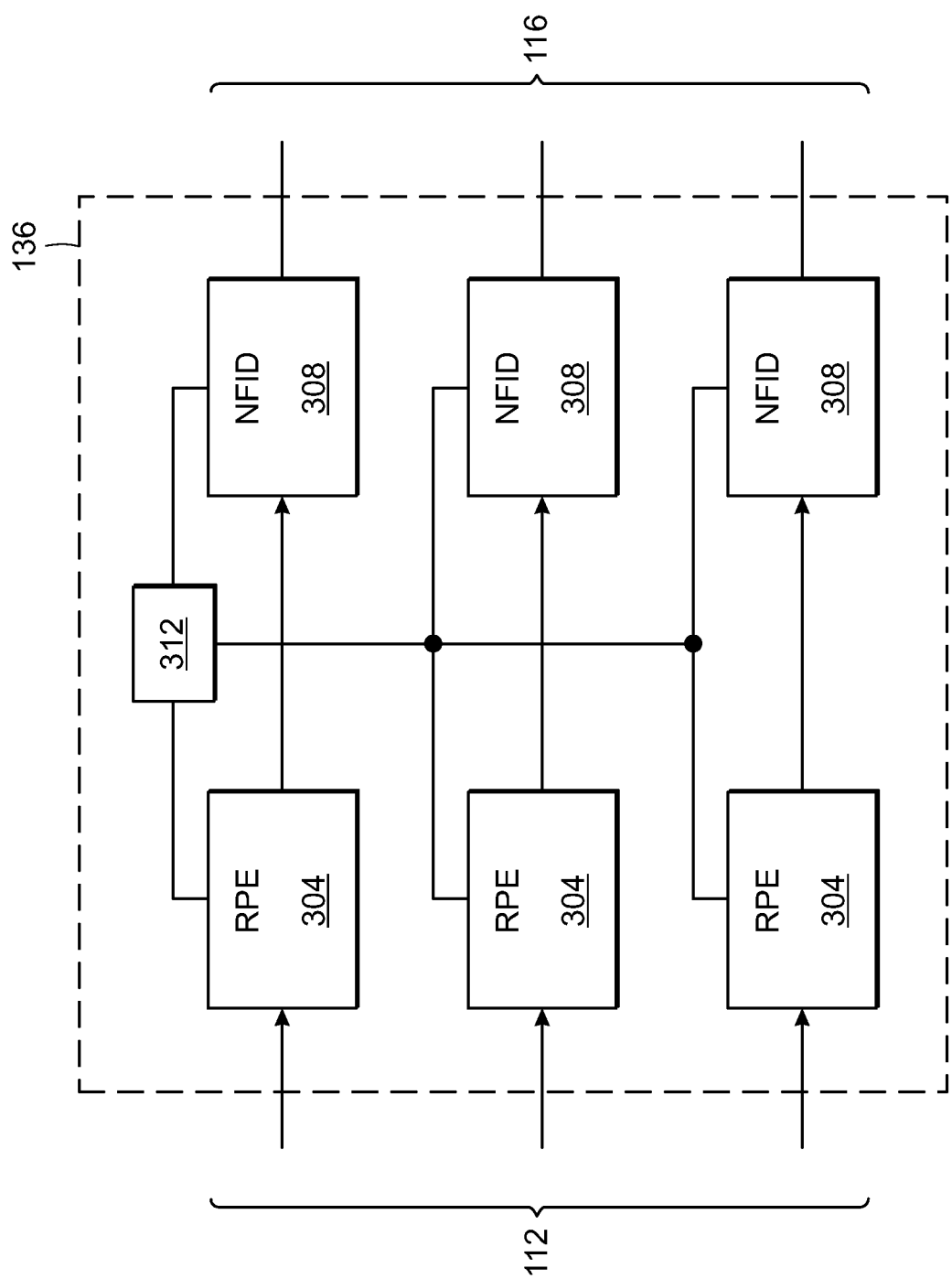
FIG. 3 is a functional block diagram of a computing tile in accordance with an aspect of the present disclosure.

Referring now to FIG. 3, each computing tile 136 includes at least one reconfigurable processing element (RPE) 304, for example, but not limited to, an FPGA. The RPE 304 is coupled to a corresponding network fabric interface (NFI) device 308 that is configured to interface with the HPC network fabric. The NFI device 308, in one non-limiting example, is an Application Specific IC (ASIC) provided and configured, per known techniques, to function as an interface to the HPC network fabric.

A support controller 312 may also be incorporated into each computing tile 136 and coupled to the RPE 304 and the ASIC 308. The support controller 312 on each computing tile is generally programmed to, among other tasks, coordinate the operations of the RPE 304 and the ASIC 308 as well as communicate with other computing tiles in the RCA 100. The support controller 312 may include, as known to one of ordinary skill in the art, a CPU, ROM, RAM, I/O interface, etc.

The RPE 304 is programmed per known techniques via, in one approach, the front panel connections discussed above and provides processing throughput capacity that may exceed software-based solutions. Alternatively, the RPE 304 may be programmed through an interface to the support controller 312, a pre-programmed memory or another interface such as one that is compliant with the Joint Test Action Group (JTAG) industry standard. On a computing tile 136 that includes multiple RPEs, each RPE may be programmed in a same configuration or each RPE may be programmed in a configuration that is different from the other RPEs on the computing tile 136.

Further, in an RCA 100 that has multiple computing tiles 136, there may be differences in the programming, i.e., configurations, of the respective RPEs from one computing tile 136 to the next. Advantageously, the computing tiles 136 can be provisioned in a manner customized for the intended operation.

Thus, aspects of the present disclosure provide programmable logic solutions, via the computing tiles and respective RPEs, as native participants on a computing fabric in the same manner as general purpose computing solutions. The reconfigurable I/O mechanism available through the plug configuration of the I/O ports provides the flexibility to meet different processing needs, for example, radar signal processing and machine learning, just to name a few, by applying an array of programmable elements in the RCA. Further, the tray, module, or rack form factor facilitates the application and integration into COTS or embedded computing infrastructure.

Various aspects of the above-described systems and methods may be implemented in combinations and sub-combinations of digital electronic circuitry, computer hardware, firmware, and/or software. The implementation can include, for example, a computer program product, i.e., a computer program embodied in a tangible information carrier, a machine-readable storage device to control the operation of data processing apparatus or a programmable processor, a computer and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

It is to be understood that the present disclosure has been described using non-limiting detailed descriptions of aspects thereof that are provided by way of example only and are not intended to limit the scope of the disclosure. Features and/or steps described with respect to one aspect may be used with other aspects and not all aspects of the disclosure have all of the features and/or steps shown in a particular figure or described with respect to one of the aspects. Variations of aspects described will occur to persons of skill in the art.

It should be noted that some of the above described aspects include structure, acts or details of structures and acts that may not be essential to the disclosure and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present disclosure. Therefore, the scope of the disclosure is limited only by the elements and limitations as used in the claims.

Whereas many alterations and modifications of the disclosure will no doubt become apparent to a person of ordinary skill in the art after having read the foregoing description, it is to be understood that the particular aspects shown and described by way of illustration are in no way intended to be considered limiting. Further, the subject matter has been described with reference to particular aspects, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and aspects, the present disclosure is not intended to be limited to the particulars disclosed herein; rather, the present disclosure extends to all functionally equivalent structures, methods and uses, such as are within the scope of the appended claims. Various modifications and changes may be made to the disclosed implementations by persons skilled in the art without departing from the scope of the present disclosure.

What is claimed is:

1. A reconfigurable computing appliance (RCA), comprising:
    an enclosure;
    a network fabric interface provided on the enclosure;
    a data I/O interface provided on the enclosure;
    a first computing tile provided in the enclosure;
    a second computing tile provided in the enclosure;
    a first jumper port, provided on the enclosure, coupled to the first computing tile; and
    a second jumper port, provided on the enclosure, coupled to the second computing tile,
    wherein the first and second jumper ports can be coupled to one another to couple the first and second computing tiles together, and
    wherein the first computing tile comprises:
        a network fabric interface device, coupled to the network fabric interface, configured to transmit data to, and receive data over, a network fabric; and
        a reconfigurable processing element (RPE), coupled to at least one of the network fabric interface device and the data I/O interface, and configured to process received input data from at least one of the network fabric interface device and the data I/O interface and provide output data to at least one of the network fabric interface device and the data I/O interface, wherein the output data is a function of the received input data.

2. The reconfigurable computing appliance of claim 1, further comprising:
    a daisy-chain port, provided on the enclosure, coupled to the first computing tile,
    wherein the daisy chain port is operable to couple the first computing tile to a computing tile on another RCA.

3. The reconfigurable computing appliance of claim 1, wherein the network fabric interface device is an Application Specific Integrated Circuit (ASIC).

4. The reconfigurable computing appliance of claim 1, wherein the RPE is a field programmable gate array (FPGA).

5. The reconfigurable computing appliance of claim 1, wherein the first computing tile comprises a first RPE and a second RPE, and
    wherein the first RPE is in a first configuration and the second RPE is in a second configuration different from the first configuration.

6. The reconfigurable computing appliance of claim 1, wherein the RPE on the first computing tile is in a first configuration and an RPE on the second computing tile is in a second configuration different from the first configuration.

7. The reconfigurable computing appliance of claim 1, further comprising:
    a jumper cable having a first end coupled to the first jumper port and a second end coupled to the second jumper port.

8. A computing cluster, comprising:
    a rack;
    a plurality of reconfigurable computing appliances (RCAs) mounted in the rack,
    wherein at least one RCA of the plurality of RCAs comprises:
        an enclosure;
        a network fabric interface provided on the enclosure;
        a data I/O interface provided on the enclosure;
        first and second computing tiles provided in the enclosure;
        a first jumper port, provided on the enclosure, coupled to the first computing tile; and
        a second jumper port, provided on the enclosure, coupled to the second computing tile,
        wherein the first and second jumper ports can be coupled to one another to couple the first and second computing tiles together, and
        wherein each of the first and second computing tiles comprises:
            a network fabric interface device, coupled to the network fabric interface, configured to transmit data to, and receive data over, a network fabric; and
            a reconfigurable processing element (RPE), coupled to at least one of the network fabric interface device and the data I/O interface, and configured to process received input data from at least one of the network fabric interface device and the data I/O interface and provide output data to at least one of the network fabric interface device and the data I/O interface, wherein the output data is a function of the received input data.

9. The computing cluster of claim 8, wherein each RCA further comprises:
   a daisy-chain port, provided on the enclosure, coupled to one of the first and second computing tiles,
   wherein the daisy chain port is operable to couple the one computing tile to a computing tile on another RCA.

10. The computing cluster of claim 8, wherein at least one network fabric interface device is an Application Specific Integrated Circuit (ASIC).

11. The computing cluster of claim 8, wherein at least one RPE is a field programmable gate array (FPGA).

12. The computing cluster of claim 8, wherein at least one computing tile of the first and second computing tiles comprises a first RPE and a second RPE, and
   wherein the first RPE is in a first configuration and the second RPE is in a second configuration different from the first configuration.

13. The computing cluster of claim 8,
   wherein the RPE on the first computing tile is in a first configuration and the RPE on the second computing tile is in a second configuration different from the first configuration.

14. The computing cluster of claim 8, wherein the at least one RCA further comprises:
   a jumper cable having a first end coupled to the first jumper port and a second end coupled to the second jumper port.

\* \* \* \* \*